US008903524B2

(12) United States Patent
Cafarella et al.

(10) Patent No.: US 8,903,524 B2
(45) Date of Patent: Dec. 2, 2014

(54) PROCESS AND MEANS FOR SCANNING AND/OR SYNCHRONIZING AUDIO/VIDEO EVENTS

(75) Inventors: Carlo Guido Cafarella, Cologno Monzese (IT); Giacomo Olgeni, Milan (IT)

(73) Assignee: Universal Multimedia Access S.R.L., Milan (MI) (IT)

( * ) Notice: Subject to any disclaimer, the term of this patent is extended or adjusted under 35 U.S.C. 154(b) by 798 days.

(21) Appl. No.: 13/028,625

(22) Filed: Feb. 16, 2011

(65) Prior Publication Data

US 2012/0194737 A1 Aug. 2, 2012

(30) Foreign Application Priority Data

Jan. 28, 2011 (IT) .............................. MI2011A0103

(51) Int. Cl.
*G06F 17/00* (2006.01)
*H04R 29/00* (2006.01)
*G10L 25/48* (2013.01)
*G10L 19/02* (2013.01)

(52) U.S. Cl.
CPC ............. *G10L 25/48* (2013.01); *G10L 19/0204* (2013.01)
USPC ............................................... 700/94; 381/56

(58) Field of Classification Search
USPC ............ 381/56; 700/94; 348/425.4, 512, 515, 348/524
See application file for complete search history.

(56) References Cited

U.S. PATENT DOCUMENTS

| | | | | |
|---|---|---|---|---|
| 7,477,739 B2 * | 1/2009 | Haitsma et al. | 380/201 |
| 7,523,312 B2 * | 4/2009 | Kalker et al. | 713/176 |
| 7,549,052 B2 * | 6/2009 | Haitsma et al. | 713/180 |
| 7,711,123 B2 * | 5/2010 | Crockett | 381/56 |
| 8,015,480 B2 * | 9/2011 | Abbott et al. | 715/201 |
| 2005/0144455 A1 * | 6/2005 | Haitsma | 713/176 |
| 2006/0031381 A1 * | 2/2006 | Van Luijt et al. | 709/217 |

FOREIGN PATENT DOCUMENTS

| | | |
|---|---|---|
| GB | 2213623 A | 8/1989 |
| WO | 9716820 A1 | 5/1997 |

OTHER PUBLICATIONS

Search Report for Italian Application No. MI2011000103 completed Aug. 31, 2011 with machine translation to English.
Written Opinion for Italian Application No. MI2011000103 completed Aug. 31, 2011 with machine translation to English.
Olgeni, Giacomo, et al., Movie Reading User Manual.

* cited by examiner

*Primary Examiner* — Paul S Kim
*Assistant Examiner* — David Ton
(74) *Attorney, Agent, or Firm* — Steinfl & Bruno LLP

(57) ABSTRACT

A process for scanning and/or synchronizing audio/video events is described. According to the process, a signal is acquired and divided into a plurality of segments corresponding to different moments of the signal. A spectrogram is generated and peaks are located in the spectrogram. Transition peaks are located among said peaks, and the bands of such transition peaks are combined in one or more transitions to which hashes correspond. The hashes are associated with the time at which the transitions occur in the signal. Means for scanning and/or synchronizing audio/video events are also disclosed.

33 Claims, 4 Drawing Sheets

PROCESS AND MEANS FOR SCANNING AND/OR SYNCHRONIZING AUDIO/VIDEO EVENTS

CROSS REFERENCE TO RELATED APPLICATIONS

The present application claims priority to Italian patent application MI2011A000103 filed on Jan. 28, 2011, which is incorporated herein by reference in its entirety.

FIELD

The present disclosure relates to a process and means for scanning and/or synchronizing audio/video events, in particular a process that can be implemented by at least an audio processor for scanning and/or synchronizing respectively reference or environmental audio signals of an audio or video event.

BACKGROUND

A user attending an audio/video event may need help allowing him/her to better understand that event. For example, if the audio/video event is a movie, the user may need subtitles or a spoken description of the event, a visual description of the event in the sign language or other audio/video information related to the event. The user can load into a portable electronic device provided with a display and/or a speaker, e.g. a mobile phone or smartphone, at least one audio/video file corresponding to said help, however this may be difficult to synchronize with the event, especially if the event includes pauses or cuts, or if the audio/video file is read after the event has started.

SUMMARY

According to several embodiments of the present disclosure, help is provided which can be free from the above-mentioned drawbacks.

In particular, according to a first aspect, a process for scanning and/or synchronizing audio/video events is provided, the process comprising the following operating steps:

At least one audio processor acquires at least one signal of the audio of an audio/video event; the audio processor divides said signal into a plurality of segments corresponding to different moments of the signal; the audio processor generates a spectrogram comprising a plurality of frequency bands in each segment of the signal; the audio processor locates in the spectrogram, among the bands of each segment of the signal, one or more peaks in which the magnitude of the corresponding band is greater than the magnitudes of the other bands; the audio processor locates among said peaks of the spectrogram the transition peaks which at a given moment have a band differing from the bands of the peaks at a previous moment; the audio processor combines, in at least one or more transitions, the moment and the band of a transition peak with the moment and the band of one or more subsequent transition peaks. The audio processor associates one or more hashes corresponding to one or more transitions with the moment or the moments at which these transitions occur in the signal.

According to a further aspect, an index file is provided, the index file comprising one or more hashes corresponding to one or more transitions between peaks of a spectrogram of a signal corresponding to the audio of an audio/video event.

Additional aspects are provided in the specification, drawings and claims of the present application.

According to some embodiments, thanks to the peculiar steps of analysis of the audio signal of the audio/video event, the process for scanning and/or synchronizing audio/video events allows to scan this signal in a simple and effective way, so as to generate a relatively compact index file that can be easily distributed through the Internet to be loaded and run also in an audio processor with comparatively limited resources, e.g. a mobile phone or smartphone.

According to some embodiments, the process itself can therefore be implemented in the audio processor for scanning in real time the environmental audio signal of the event and synchronizing with this event in a fast and reliable manner, even in the presence of disturbances or background noise, an audio/video file corresponding to the required help, that can be read by the same audio processor.

BRIEF DESCRIPTION OF THE DRAWINGS

Further features of the process and means according to some embodiments of the present disclosure will be clear to those skilled in the art from the following detailed and non-limiting description of embodiments thereof, with reference to the annexed drawings wherein.

DETAILED DESCRIPTION

Figure 1:
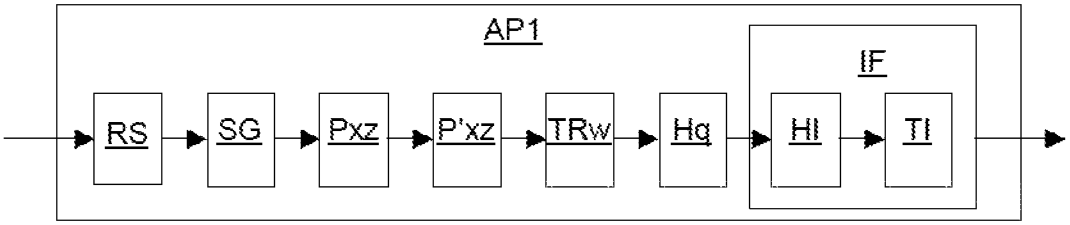
FIG. 1 shows a block diagram of a first audio processor.

With reference to FIG. 1, there is seen that in the scanning process according to the present disclosure at least a first audio processor AP1 acquires a reference signal RS of the audio of an event, e.g. a movie, a show, a TV broadcast, a music, a song, a speech or another kind of audio/video event. The reference signal RS is generally a digital audio signal contained in at least an audio or video file suitable to be loaded into the memory of a first audio processor AP1, that in turn is an electronic device, e.g. a computer or other digital processor, even of known type, which is provided with at least one microprocessor and a digital memory to load and run at least one program that implements the process according to the present disclosure. The reference signal RS can also be obtained by directly sampling through a sampling device an analog audio signal of the event acquired through a microphone.

Figure 2:
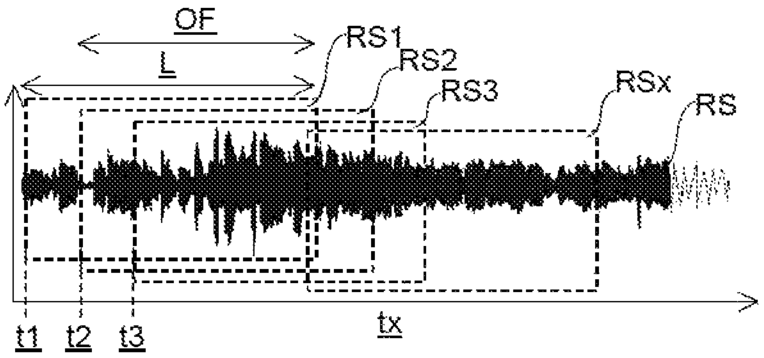
FIG. 2 shows the diagram of a reference signal scanned by the audio processor of FIG. 1.

Referring also to FIG. 2, there is seen that the first audio processor AP1 divides the reference signal RS into a plurality j of segments RSx, with x between 1 and j, which have a length L, for instance 512 samples, and overlap by an overlapping factor OF, in particular between L/2 and L (excluding L), for instance 384 samples. Segments RSx are arranged consecutively for the whole duration of the reference signal RS, i.e. each segment RSx corresponds to a time or moment tx of the reference signal RS, which time or moment tx is proportional to the time t elapsed since the beginning of the reference signal RS and is inversely proportional to the sampling frequency sf of the reference signal RS and to the difference between length L and the overlapping factor OF of segments RSx. Therefore, if sf=11 kHz, L=512 and OF=384, then tx=t/(sf*(L−OF))=85.93 t, i.e. a second of the reference signal RS includes almost 86 segments RSx.

Figure 3:
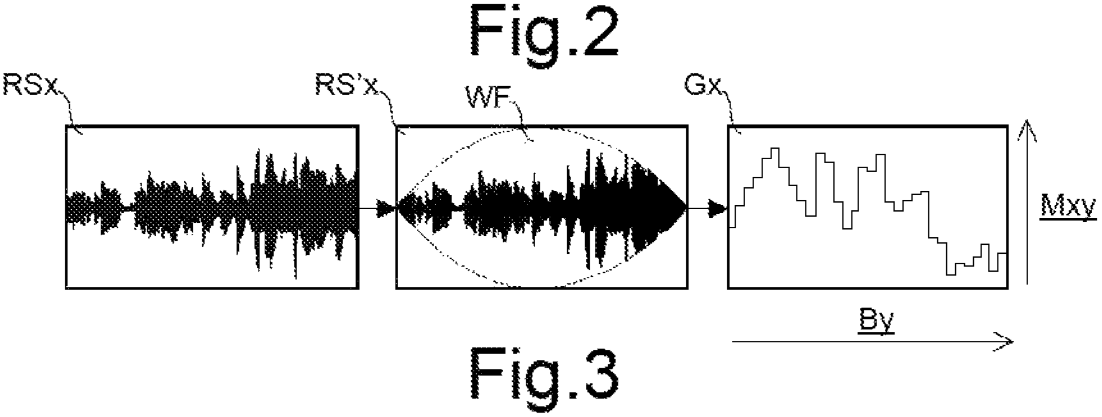
FIG. 3 shows different steps of the scanning process of the signal of FIG. 2.

Referring also to FIG. 3, there is seen that the first audio processor AP1 processes each segment RSx through a window function WF, in particular implemented with a squared cosine, that attenuates the signal at the ends of segment RSx, so as to obtain an attenuated segment RS'x, whereafter the first audio processor AP1 performs a conversion of the attenuated segment RS'x in the frequency domain, in particular with a Fourier transform, e.g. of the DFT type (Direct Fourier Transform) that is implemented in turn through a FFT algorithm (Fast Fourier Transform), so as to obtain a group Gx of n complex numbers Cxy, with y between 1 and n, as well as with n preferably between 100 and 300. Therefore, calculating the quadratic average of the modules of the complex numbers Cxy, the first audio processor AP1 determines the magnitude Mxy of each of the n frequency bands By in the signal of segment RSx. Bands By may have for instance a constant width sf/2n or variable widths, e.g. with a logarithmic or exponential increase of the frequencies in each band By.

Figure 4:
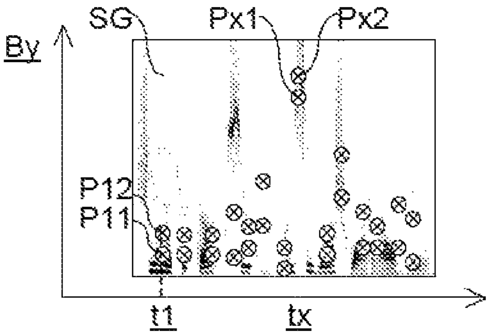
FIG. 4 shows a spectrogram of the signal of FIG. 2.

Referring also to FIG. 4, there is seen that the first audio processor AP1 generates, in particular with a STFT algorithm (Short-Time Fourier Transform), a spectrogram SG of the reference signal RS, which spectrogram includes a plurality j of groups Gx that in turn includes a plurality n of magnitudes Mxy in bands By in each segment RSx of the reference signal RS.

The first audio processor AP1 then locates in spectrogram SG, among bands By of each segment RSx of the reference signal RS, one or more peaks Pxz, in particular a plurality k of peaks Pxz, with z between 1 and k, in which the magnitude Mxy' of the corresponding band By' is greater than the magnitude Maxy of the other bands By. In particular, if k=2 the first audio processor AP1 locates in each segment RSx the two peaks Px1, Px2 of the bands By' and By" having the two greater magnitudes Mxy' and Mxy" with respect to the other magnitudes Mxy in the other bands By of segment RSx. In a graphical representation of spectrogram SG, peaks Pxz appear as points with coordinates [tx, By], in which each segment RSx or moment tx of the reference signal RS is associated with a plurality k of bands By.

Figure 5:
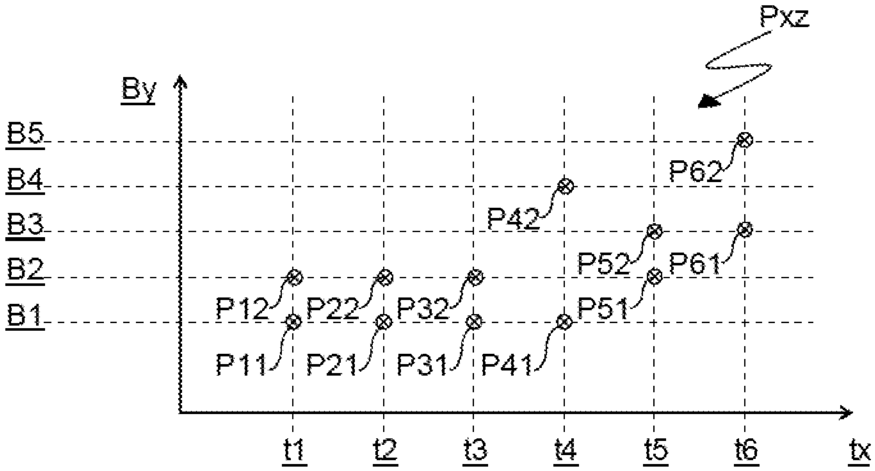
FIG. 5 shows a first processing step of the spectrogram of FIG. 4.
Figure 6:
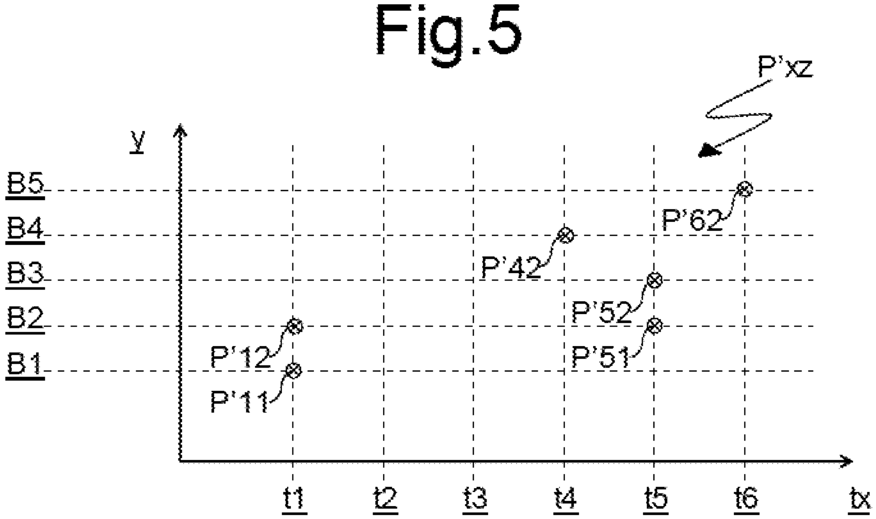
FIG. 6 shows a second processing step of the spectrogram of FIG. 4.

Referring also to FIGS. 5 and 6, there is seen that the first audio processor AP1, after having located peaks Pxz during the analysis of spectrogram SG, locates in turn among these peaks Pxz the transition peaks P'xz, i.e. the peaks Pxz whose band By' at moment tx' is different from bands By of peaks Pxz at a previous moment tx'−1. For example, with k=2, if peaks P11, P21, P31 and peaks P12, P22, P32 are respectively in the same bands B1, B2, then peak P41 is still in band B1 whereas peak P42 is in band B4, then peaks P51, P52 are respectively in bands B2, B3 and peaks P61, P62 are respectively in bands B3 and B5, the first audio processor AP1 will then select the transition peaks P'11, P'12, P'42, P'51, P'52 and P'62, discarding the remaining peaks of spectrogram SG, as shown in FIG. 6.

The first audio processor AP1, after having located the transition peaks P'xz in spectrogram SG, combines moment tx' and band By' of a transition peak P'x'z with moment tx" and band By" of one or more subsequent transition peaks P'x"z into a plurality of transitions TRw. In particular, the first audio processor AP1 locates all transition peaks P'xz comprised in a temporal window that includes a plurality m of subsequent moments tx in which there is present at least one transition peak P'xz, with m preferably between 5 and 15. In the example of FIGS. 5 and 6, e.g. if m=2 (low value selected for simplicity) transitions TRw include the following transitions:

TR1: based on values t1, B1 of transition peak P'11 and on values t4, B4 of transition peak P'42;

TR2: based on values t1, B1 of transition peak P'11 and on values t5, B2 of transition peak P'51;

TR3: based on values t1, B1 of transition peak P'11 and on values t5, B3 of transition peak P'52;

TR4: based on values t1, B2 of transition peak P'12 and on values t4, B4 of transition peak P'42;

TR5: based on values t1, B2 of transition peak P'12 and on values t5, B2 of transition peak P'51;

TR6: based on values t1, B2 of transition peak P'12 and on values t5, B3 of transition peak P'52;

TR7: based on values t4, B4 of transition peak P'42 and on values t5, B3 of transition peak P'52;

TR8: based on values t4, B4 of transition peak P'42 and on values t6, B5 of transition peak P'62;

TR7: based on values t5, B2 of transition peak P'51 and on values t6, B5 of transition peak P'62, and so on.

Figure 7:
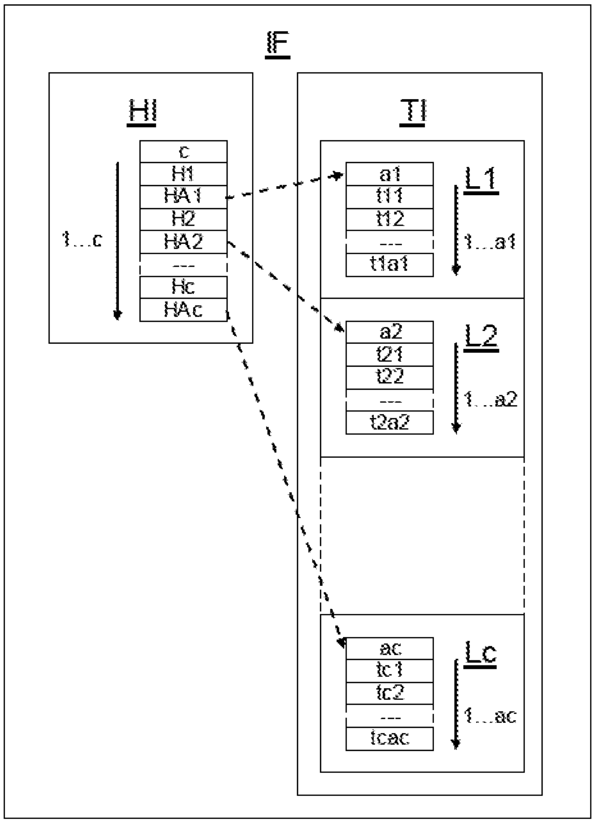
FIG. 7 shows a scheme of an index file generated by the audio processor of FIG. 1.

Referring to FIG. 7, there is seen that the first audio processor AP1 can combine moments tx', tx" and bands By', By" of the two transition peaks P'x'z and P'x"z of a transition TRw in different ways. Preferably, the first audio processor AP1 associates a transition TRw with a 32-bit hash Hq in at least one index file IF, with q between 1 and c, in which 8 bits correspond to band By' of the first transition peak P'x'z of transition TRw, 8 bits correspond to band By" of the second transition peak P'x"z of transition TRw and 16 bits correspond to the difference Δtx between moments tx" and tx' at which these two transition peaks P'x'z, P'x"z appear in the reference signal RS, i.e. the duration Δtx of transition TRw. The first audio processor AP1 then associates in index file IF said hash Hq with each moment tx, in particular with moment tx' of the first transition peak P'x'z, of each same transition TRw that occurs in the reference signal RS. The index file IF therefore includes a plurality c of hashes Hq corresponding to all possible transitions TRw with different duration Δtx and/or band By' and/or band By", that are present one or more times in the reference signal RS. Therefore, if a transition TRw' having the same duration Δtx and the same bands By', By" of a previous transition TRw is repeated at a subsequent moment tx" in the reference signal RS, the first audio processor AP1 does not create a new hash in the way described above but associates also moment tx" of the subsequent transition TRw' with hash Hq in the index file IF.

Therefore the index file IF contains a series of hashes Hq, each of which corresponds to a possible different transition TRw in the reference signal RS and is associated with all moments tx at which this transition TRw occurs in the reference signal RS. The index file IF suitably contains at least one hash index HI and at least one time index TI, which however can also be included in several separate index files IF. The hash index HI includes a first series of 32-bit values, in particular the overall number c of hashes Hq obtained from the reference signal RS, as well as the hashes Hq and the corresponding hash addresses Haq pointing to one or more occurrences lists Lq contained in the time index TI. Each occurrences list Lq of the time index TI includes a first series of 32-bit values, in particular the number of occurrences aq in which one or more transitions TRw, TRw' corresponding to a hash Hq occur in the reference signal RS and the moments tqb, with b between 1 and aq, corresponding to the moment or moments at which this transition TRw or these transitions TRw, TRw' occur in the reference signal RS. In other embodiments, one or more occurrences lists Lq may be contained in separate files, i.e. the time index TI includes more files containing one or more occurrences lists Lq.

Therefore, in the scanning process the first audio processor AP1 scans a reference signal RS to generate at least one index file IF containing one or more hashes Hq corresponding to the different possible transitions TRw between peaks Pxz of a spectrogram SG of the reference signal RS, in particular between peaks P'xz in different bands By', By" and between two subsequent moments tx' and tx". The index file IF contains also a list of the moment or moments in the reference signal RS at which each of these different transitions TRw occurs.

Figure 8:
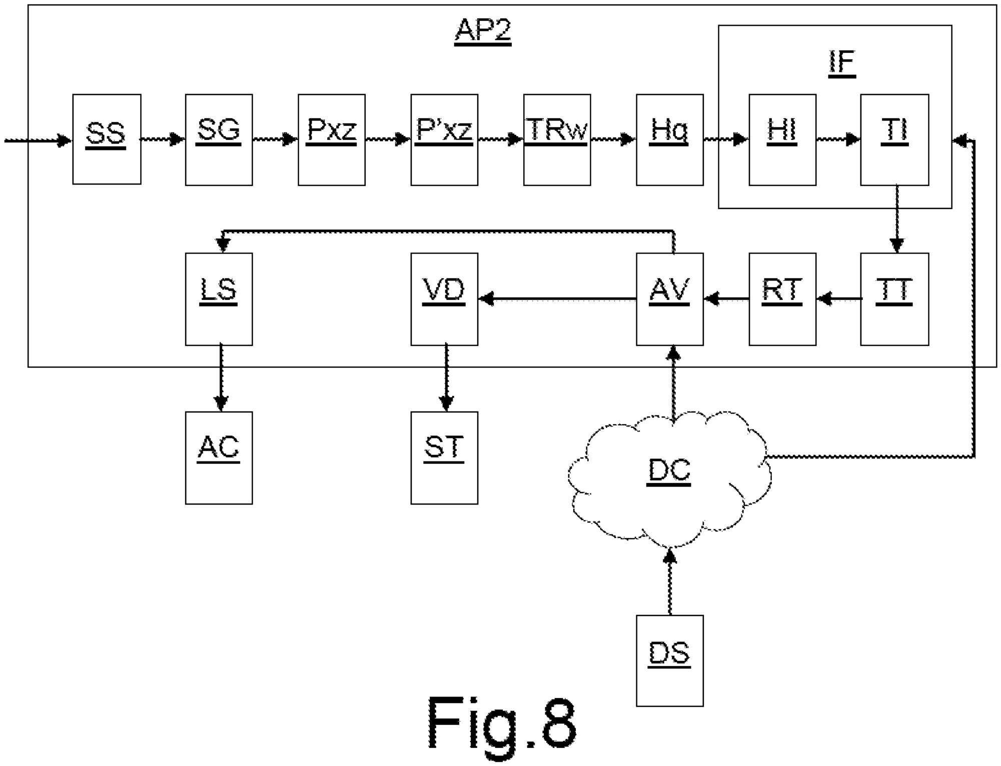
FIG. 8 shows a block diagram of a second audio processor.

Referring to FIG. 8, there is seen that in the synchronizing process according to the present disclosure at least a second audio processor AP2, that may also coincide with the first audio processor AP1, acquires a samples signal SS of the audio/video event at issue. The samples signal SS is generally a digital audio signal, e.g. 16-bit at 11 kHz, obtained by directly sampling the audio of the audio/video event with a sampling device, in particular acquired through a microphone connected to the second audio processor AP2, which in turn is an electronic device preferably portable, e.g. a mobile phone, a reader for audio/video files (for instance mp3 or mp4), a smartphone, a tablet PC, a portable PC or other electronic processor provided with at least a microprocessor and a memory to load and run at least a program implementing the process according to the present disclosure. The sampled signal SS can be filtered through a gate, so as to remove background noise when the audio/video event does not produce a signal or produces a very low signal.

The second audio processor AP2 processes a spectrogram SG of the sampled signal SS and, within said spectrogram SG, locates peaks Pxz, transition peaks P'xz and transitions TRw through the same steps, or equivalent steps, of the above-mentioned scanning process so as to obtain a sequence of hashes hq from the sampled signal SS. In the synchronizing process, the second audio processor AP2 can limit the number of bands By of spectrogram SG with respect to the scanning process depending on the quality of the sampled signal SS, that can be lower than the quality of the reference signal RS due to environmental noise and/or quality of the microphone acquiring the audio of the event to be synchronized. In practice, the bands By in which the reference signal RS and the sampled signal SS are divided are the same, but the second audio processor AP2 can exclude some bands By, e.g. those with lower and/or higher frequencies, thus considering a number n' of bands By smaller than the number n of bands By of the scanning process, i.e. n'<n. Moreover, always due to environmental noise and/or quality of the microphone acquiring the audio of the event to be synchronized, in the synchronizing process the second audio processor AP2 can locate in spectrogram SG of the sampled signal SS a number k' of peaks P'xz greater than in the scanning process, in particular k'=3, with z between 1 and k', in which the magnitude Mxy' of the corresponding band By' is greater than the magnitudes Mxy of the other bands By.

The second audio processor AP2 also processes at least one hash index HI associated with a reference signal RS of the vent of the sampled signal SS. This hash index HI is not obtained from the hashes Hq of the sampled signal SS but is contained in an index file IF that is obtained from a reference signal RS, in particular through the above-described scanning process, and is loaded through a mass memory and/or a data connection DC. For instance, the index file IF is transmitted on demand from a data server DS through the Internet or the cellular network to be loaded into a memory of the second audio processor AP2 by a user that knows the audio/video event corresponding to the reference signal RS, e.g., to the index file IF and/or the sampled signal SS. In practice, prior to acquiring the sampled signal SS, a user loads into a memory, in particular a non-volatile memory, of the second audio processor AP2 at least one index file IF associated with the audio/video event. When the program implementing the synchronization process is started, the second audio processor AP2 loads into a volatile memory the hash index HI of the index file IF. The user can also select and load into a memory of the second audio processor AP2 one or more audio/video files AV, e.g. files containing subtitles, texts, images, audio and/or video passages, to be synchronized with the audio/video event through the index file IF loaded into the memory of the second audio processor AP2. The data server DS can transmit on demand through the Internet or the cellular network also the audio/video files AV associated with the index file IF.

For each hash Hq obtained from the sampled signal SS, the second audio processor AP2 locates the hash address Haq in the hash index HI of the index file IF and loads into a memory, in particular a volatile memory, the occurrences list Lq pointed at by the hash address Haq of the index file IF. Alternatively, if the resources are sufficient, the second audio processor AP2 can load in a volatile memory all the occurrences lists Lq of the time index TI upon starting the program. The second audio processor AP2 thus modifies a time table TT according to the moment tq1 or the moments tqb contained in the occurrences list Lq pointed at by the hash address Haq and to the time ta elapsed from the moment when the second audio processor AP2 started acquiring the sampled signal SS. The elapsed time ta may be measured by a clock of the second audio processor AP2.

Figure 9:
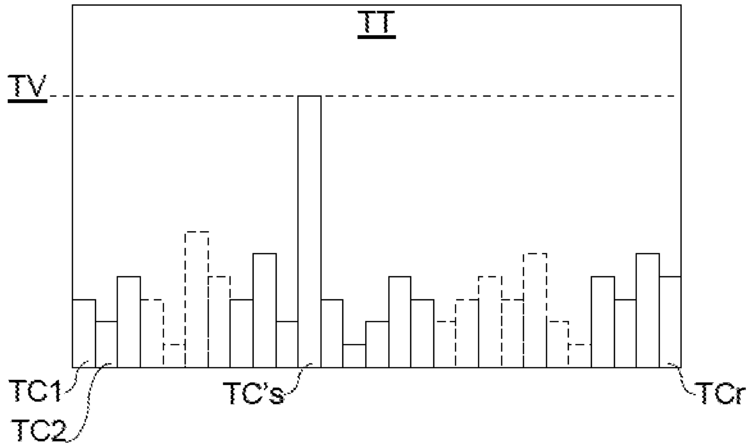
FIG. 9 shows a time table generated by the audio processor of FIG. 1.

Referring to FIG. 9, there is seen that the time table TT preferably includes a plurality r of time counters TCs, with s between 1 and r, which are associated with time slots of the reference signal RS or of the sampled signal SS. For instance, if the maximum duration Tmax of the reference signal RS is 3 hours (an audio/video event usually does not exceed this duration) and r=65536, then the duration of each time slot is equal to Tmax/r, i.e. about 0.16 seconds. When the second audio processor AP2 obtains a hash Hq from the sampled signal SS, it modifies, in particular it increases, in the time table TT the value of each counter TCs associated with the time slot corresponding to the difference between the value of each moment tqb in the occurrences list Lq associated with hash Hq and the time ta elapsed from the moment when the second audio processor AP2 started acquiring the sampled signal SS, i.e. TCs=TCs+1 with s=tqb−ta. The second audio processor AP2 can modify the time table TT also according to the processing time tb required by the second audio processor AP2 to obtain hash Hq or the corresponding occurrences list Lq, in particular by adding said processing time tb to the elapsed time ta, i.e. TCs=TCs+1 with s=tqb−(ta+tb). Through such a trick, the counter TC's associated with the time slot comprising the starting time ts of the acquisition of the sampled signal SS, after the second audio processor AP2 has obtained a significant plurality of hashes Hq, is increased statistically more than the other counters TCs, since most of the hashes Hq should be associated with the starting time ts. The second audio processor AP2 adds the starting time ts to the elapsed time ta and, if desired, also to the processing time tb to obtain the real time RT of the event, i.e. RT=ts+ta or RT=ts+ta+tb.

Therefore, after an elapsed time ta or a certain number of hashes Hq obtained from the sampled signal SS or after that a counter TC's is greater, e.g. double or triple, than the other counters TCs or after that a counter TCs has reached a given threshold value TV or after that a user has sent a command through an input device, the second audio processor AP2 determines in the above-described manner the real time RT of the sampled signal SS, which therefore can be used to synchronize the audio/video file AV with the sampled signal SS. The second audio processor AP2 or another electronic device can therefore process the audio/video file AV to generate an audio/video output, e.g. subtitles ST shown on the video display VD and/or an audio content AC commenting or translating the event, broadcast through a loudspeaker LS, which audio/video output is synchronized with the sampled signal SS of the audio/video event.

The second audio processor AP2 can repeat one or more times, manually or automatically, in particular periodically, the synchronizing process to check whether the sampled signal SS is actually synchronized with the reference signal RS. The second audio processor AP2 can calculate the difference between the real time RT1 obtained when the process was first performed and the real time RT2 when the process was performed a second time, as well as the difference given by the clock of the second audio processor AP2 between the starting times ts1 and ts2 of the two processes. The second audio processor AP2 can therefore calculate a correction factor CF proportional to the ratio between said differences, i.e. CF=(RT2−RT1)/(ts2−ts1), which correction factor CF can be multiplied by the real time RT2 determined by the second audio processor AP2 during the second synchronizing process, so as to make up for a possible slowing down or acceleration of the sampled signal SS with respect to the reference signal RS and thus obtain a new corrected real time RT', i.e. RT'=(ts2+ta)*CF or RT'=(ts2+ta+tb)*CF, which again can be used to synchronize the audio/video file AV. However, if the module of the correction factor CF is greater than a given threshold value, the sampled signal SS should not have slowed down or accelerated with respect to the reference signal RS, but rather a pause or a jump in the sampled signal SS should have occurred, whereby the second audio processor AP2 does not use the correction factor CF to correct the real time RT.

Possible additions and/or modifications may be made by those skilled in the art to the above-described embodiments of the disclosure, yet without departing from the scope of the appended claims.

The invention claimed is:

1. A process for scanning and/or synchronizing audio/video events, the process comprising the following operating steps:

acquiring at least one signal with at least one audio processor, the at least one signal associated with audio content of an audio/video event;

dividing the acquired at least one signal into a plurality of segments corresponding to different moments of the signal;

generating a spectrogram comprising a plurality of frequency bands in each segment of the plurality of segments of the divided signal;

locating within the generated spectrogram, among the bands of each segment of the signal, one or more peaks in which a magnitude of the corresponding band is greater than each of a plurality of magnitudes of the other bands;

locating among said located peaks of the generated spectrogram one or more transition peaks, each of which at a given moment have a band differing from the bands of the peaks at a previous moment;

combining, in at least one or more transitions, the moment and the band of a transition peak, with the moment and the band of one or more subsequent transition peaks; and associating one or more hashes corresponding to one or more transitions with at least one moment at which the transitions occur in the acquired at least one signal.

2. The process according to claim 1, wherein said hashes comprise the band of the first transition peak of a transition, the band of the second transition peak of the same transition and the difference between the moments at which these two transition peaks occur in the signal.

3. The process according to claim 1, wherein said hashes are associated in at least one index file with said moments at which said transitions occur in the signal.

4. The process according to claim 3, wherein the index file comprises said hashes and corresponding hash addresses which point at one or more occurrences lists.

5. The process according to claim 4, wherein said occurrences lists comprise the number of occurrences of the moments at which one or more transitions corresponding to a hash occur in the signal.

6. The process according to claim 4, wherein said occurrences lists comprise the moments at which one or more transitions corresponding to a hash occur in the signal.

7. The process according to claim 1, wherein the audio processor locates the transition peaks included in a time window which comprises a plurality of subsequent moments at which at least one transition peak is present.

8. The process according to claim 7, wherein said plurality of subsequent moments is comprised between 5 and 15.

9. The process according to claim 1, wherein said spectrogram comprises a plurality of bands comprised between 100 and 300.

10. The process according to claim 1, wherein the audio processor locates in the spectrogram, among the bands of each segment of the signal, two or three peaks in which the magnitude of the corresponding bands is greater than the magnitudes of the other bands.

11. The process according to claim 1, wherein said signal is a sampled signal of the audio of an audio/video event.

12. The process according to claim 11, wherein the audio processor repeats the same process for determining a correction factor to make up for slowing downs or accelerations, if any, of the sampled signal.

13. The process according to claim 12, wherein said correction factor is proportional to the difference between the real time obtained when the process was performed a first time and the real time obtained when the process was performed a second time, and is inversely proportional to the difference between the starting times of the two processes.

14. The process according to claim 13, wherein if the module of the correction factor is greater than a given threshold value, it is not used to correct the real time of the sampled signal.

15. The process according to claim 11, wherein the audio processor loads into at least one memory at least one index file associated with said sampled signal.

16. The process according to claim 15, wherein the audio processor locates in the index file at least one hash address associated with a hash obtained from the sampled signal.

17. The process according to claim 16, wherein the audio processor loads into at least one memory at least one occurrences list pointed at by said hash address.

18. The process according to claim 15, wherein the audio processor modifies a time table according to the moment or the moments associated in the index file with a hash obtained from the sampled signal.

19. The process according to claim 18, wherein said moment or moments associated with the hash in the index file are contained in the occurrences list pointed at by the hash address associated with the same hash.

20. The process according to claim 18, wherein the audio processor modifies the time table also according to the time elapsed from the moment at which the audio processor started to obtain the sampled signal.

21. The process according to claim 18, wherein the audio processor modifies the time table also according to the processing time used to obtain the hash or the corresponding occurrences list.

22. The process according to claim 18, wherein the time table comprises a plurality of time counters associated with time slots of the sampled signal.

23. The process according to claim 22, wherein when the audio processor obtains a hash from the sampled signal, it modifies in the time table the value of each counter associated with the time slot corresponding to the difference between the value of each moment in the occurrences list corresponding to the hash and the time elapsed from the moment at which the audio processor started to obtain the sampled signal.

24. The process according to claim 23, wherein the audio processor determines the real time of the sampled signal by adding the value of a counter in the time table to the time elapsed from the moment at which the audio processor started to obtain the sampled signal.

25. The process according to claim 24, wherein said value of said counter in the time table is greater than the values of all the other counters in the time table.

26. The process according to claim 24, wherein the audio processor uses said real time for synchronizing at least one audio/video file with the sampled signal.

27. The process according to claim 1, wherein said signal is a reference signal of the audio of an audio/video event.

28. A memory device comprising instructions, which when executed by one or more audio processors, implements the process according to claim 1.

29. An audio processor comprising the memory device according to claim 28.

30. A memory device comprising an index file, the index file comprising one or more hashes corresponding respectively to one or more transitions between peaks of a spectrogram of a signal, the signal corresponding to the audio of an audio/video event, wherein the index file, when processed by one or more processors, implements the process according to claim 3.

31. The memory device according to claim 30, wherein said hashes of the index file are associated in the index file with the moment or the moments at which said transitions occur in said signal.

32. A data server, said data server operable with the memory device according to claim 30 for transmitting on demand, through a data connection, the one or more hashes of the index file, which correspond respectively to the one or more transitions between the spectrogram peaks.

33. The data server according to claim 32, said data server further operable for transmitting on demand, through a data connection, also an audio/video file associated with said index file based at least in part on the one or more hashes.

* * * * *